(12) United States Patent
Hardage et al.

(10) Patent No.: US 6,831,877 B2
(45) Date of Patent: Dec. 14, 2004

(54) SYSTEM AND METHOD FOR DETERMINING AN AZIMUTH OF A SEISMIC ENERGY SOURCE

(75) Inventors: Bob A. Hardage, Burnet, TX (US); Allen L. Gilmer, Austin, TX (US)

(73) Assignees: Vecta Technologies, Inc., Dallas, TX (US); Board of Regents for the Univ. of Texas System, Austin, TX (US)

( * ) Notice: Subject to any disclaimer, the term of this patent is extended or adjusted under 35 U.S.C. 154(b) by 636 days.

(21) Appl. No.: 09/952,430

(22) Filed: Sep. 14, 2001

(65) Prior Publication Data

US 2002/0122351 A1 Sep. 5, 2002

Related U.S. Application Data

(63) Continuation-in-part of application No. 09/436,453, filed on Nov. 8, 1999, now abandoned.

(51) Int. Cl.⁷ ............................ G01V 1/00; H04B 17/00
(52) U.S. Cl. ..................... 367/189; 181/113; 181/108; 181/121; 33/1 HH
(58) Field of Search ................................ 367/178, 173, 367/189, 907; 181/113, 108, 111, 114, 121; 33/1 HH (56) References Cited

U.S. PATENT DOCUMENTS

| | | | | | |
|---|---|---|---|---|---|
| 4,683,558 | A | * | 7/1987 | Karner | ...................... 181/113 |
| 4,871,045 | A | * | 10/1989 | Cole | ........................... 367/189 |
| 4,980,874 | A | * | 12/1990 | Justice, Jr. | .................. 181/121 |
| 5,062,061 | A | * | 10/1991 | Strecker et al. | ............... 367/75 |
| 6,612,396 | B1 | * | 9/2003 | Chelminski et al. | ........ 181/113 |

OTHER PUBLICATIONS

The Leading Edge—Special Section—Instrumented Oil Fields—"Shear Waves from 3–D–9–C Seismic Reflection Data—Have We Been Looking for Signal in all the Wrong Places?" by J. Simmons, and M. Backus; The Society of Exploration Geophysics; pp. 604–612; Jun. 2001.

Thesis by Bryan DeVault; Dec. 5, 2001; 110 pages.

* cited by examiner

*Primary Examiner*—Ian J. Lobo (57) ABSTRACT

The present invention provides a system for, and method of determining an azimuth of a seismic energy source. In one embodiment, the system includes a directional assembly having a mount configured to be coupled to a seismic energy source, a rotatable mass assembly coupled to the mount, a compass rose coupled to one of the mount or the rotatable mass assembly and a direction reference coupled to the other of the mount or the rotatable mass assembly. The compass rose is registered with the direction reference to provide a direction orientation of the rotatable mass assembly with respect to the mount.

30 Claims, 5 Drawing Sheets

SYSTEM AND METHOD FOR DETERMINING AN AZIMUTH OF A SEISMIC ENERGY SOURCE

CROSS-REFERENCE TO RELATED APPLICATION

This application is a continuation in part of U.S. patent application Ser. No. 09/436,453, filed on Nov. 8, 1999, now abandoned, entitled "METHOD OF SEISMIC EXPLORATION DISCRIMINATING HORIZONTAL AND VERTICAL SHEAR WAVES" to Milo Backus, et al., which is incorporated herein by reference.

TECHNICAL FIELD OF THE INVENTION

The present invention is directed, in general, to geophysical exploration and, more specifically, to a system and method for determining an azimuth of a shear wave seismic source.

BACKGROUND OF THE INVENTION

Most geophysical techniques currently dealing with multi-dimensional seismic data do not discriminate between seismic energies of different orientations, such as the compressional energy or vertical and horizontal shear energies of reflected seismic data systems. In a typical multi-dimensional seismic survey, a multi-mode seismic energy generator may be used to generate a preponderance of one orientation of seismic energy relative to a particular orientation. Then a preponderance of energies orthogonal to the first but relative to the same orientation may also be generated. However, the orientation of the received seismic energy changes at each receiver station due to a difference in orientation between the seismic energy source and each receiver in a multi-dimensional seismic array.

Differently oriented seismic energies may also propagate differently through the subsurface strata based upon the characteristics of the subsurface strata. Anisotropies in the subsurface strata also impact the seismic energies of different orientations, especially shear wave energy. Anisotropic subsurface parameters may be found in the form of thin-bed strata, laminae and bed matrix grains or pores that have a preferential direction caused by deposition or tectonic stress. Another common form of anisotropic subsurface properties are subsurface fractures. Anisotropies cause subsurface parameters such as permeability, shear strength and seismic velocities to have different values in different directions.

Compressional energy waves may generate vertical shear energy waves at subsurface interfaces. Additionally, vertical and horizontal shear waves may acquire significant second-order properties in areas containing subsurface anisotropies that complicate the problem of intermingling but also offer opportunity for analysis if the energies could be segregated. However, the processing of such data is complicated due to the intermingling and therefore not easily discriminated into the differently oriented energies for each source-receiver azimuth. Also, the processing of these components is further complicated since the orientation of the operational modes of the seismic energy source do not generally correspond to the orientation of each receiver in the geophysical data acquisition array.

The mapping of subsurface features may be greatly enhanced by processing the differently oriented seismic energies in a way that accommodates their different attributes. This is especially true in an orientation specific to the azimuths defined by each seismic energy source and receiver pair. Additionally, important rock property information could be ascertained by comparing differences and similarities of the attributes of the appropriately oriented seismic energies.

The orientation of seismic energy from a seismic energy source operating in the field is normally directed in either an inline or a crossline direction. This is due to field operating complexities and seismic energy source constraints. This situation often results in a less-than-desired level of seismic energy occurring in a particular direction than is really needed to clearly illuminate a subsurface event. This situation may not be fully appreciated until post-field processing has occurred sometimes requiring the collection of more field data to rectify. Additionally, orienting the seismic energy source in a normal field survey environment to provide other than inline or crossline seismic energy is typically difficult, at best.

Accordingly, what is needed in the art is a way to more effectively orient and segregate seismic source energy in seismic surveying situations.

SUMMARY OF THE INVENTION

To address the above-discussed deficiencies of the prior art, the present invention provides a directional assembly for determining an azimuth of a seismic energy source. In one embodiment, the directional assembly includes a mount configured to be coupled to the seismic energy source, a rotatable mass assembly coupled to the mount, a compass rose coupled to one of the mount or the rotatable mass assembly and a direction reference coupled to the other of the mount or the rotatable mass assembly. The compass rose is registered with the direction reference to provide a direction orientation of the rotatable mass assembly with respect to the mount.

In a particular embodiment, the compass rose is coupled to the mount and the direction reference is coupled to the rotatable mass assembly. In an alternative embodiment, the compass rose is coupled to the rotatable mass assembly and the direction reference is coupled to the mount. In either of these embodiments, the direction reference is magnetic north. Alternatively, the direction reference may correspond with a cross line direction, an inline direction or to another advantageously selected direction.

In yet another embodiment, the compass rose includes a signal transmitter and the direction reference includes a signal receiver. Alternatively, the compass rose may include a signal receiver and the direction reference may include a signal transmitter. The signal transmitter is located adjacent an outer circumference of the compass rose and corresponds to a degree of rotation about the circumference. A direction indicator is associated with the direction reference and is configured to provide data regarding the orientation of the rotatable mass assembly. Further, a communication network, coupled to the direction indicator, is configured to transmit the orientation data to a remote recording location.

The present invention also provides a seismic exploration system. In an advantageous embodiment, the system includes a seismic energy source employing a support structure, a directional assembly coupled to the support structure that includes a mount coupled to the support structure, a rotatable mass assembly coupable to the mount, a compass rose coupled to one of the mount or the rotatable mass assembly, a direction reference coupled to another of the one of the mount or the rotatable mass assembly, receivers located on a terrain and a seismic recorder system. The compass rose is registered with the direction reference to provide a direction orientation of the rotatable mass assembly with respect to the mount.

In another aspect, the present invention provides a method of orienting a seismic source. In one exemplary embodiment, the method includes registering a compass rose with a direction reference to orient a rotatable mass assembly of a seismic source with respect to a mount of the seismic source, wherein the compass rose is coupled to either the mount or the rotatable mass assembly with the direction reference being coupled to the other of the mount or the rotatable mass assembly.

The foregoing has outlined, rather broadly, preferred and alternative features of the present invention so that those skilled in the art may better understand the detailed description of the invention that follows. Additional features of the invention will be described hereinafter that form the subject of the claims of the invention. Those skilled in the art should appreciate that they can readily use the disclosed conception and specific embodiments as a basis for designing or modifying other structures for carrying out the same purposes of the present invention. Those skilled in the art should also realize that such equivalent constructions do not depart from the spirit and scope of the invention in its broadest form.

BRIEF DESCRIPTION OF THE DRAWINGS

For a more complete understanding of the present invention, reference is now made to the following descriptions taken in conjunction with the accompanying drawings, in which.

DETAILED DESCRIPTION

Figure 1:
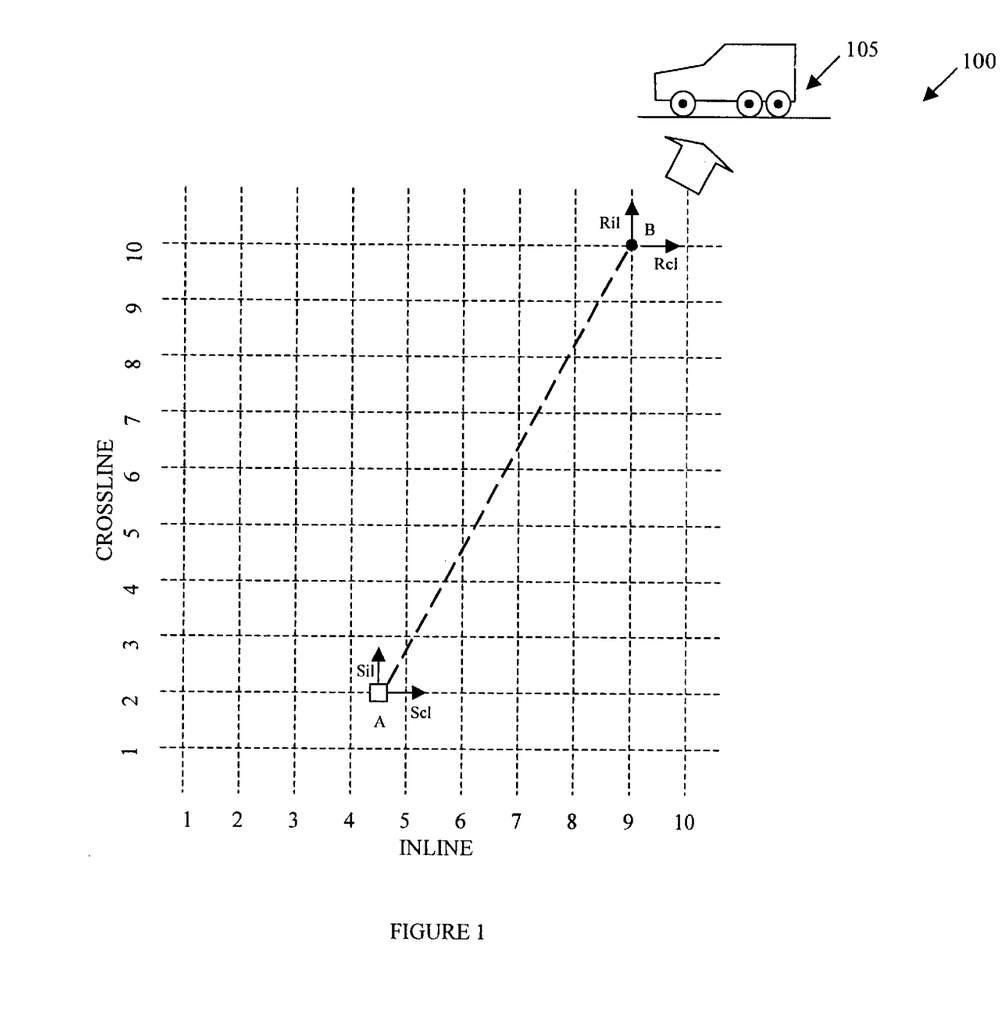
FIG. 1 illustrates a plan view of a volumetric or three dimensional (3-D) seismic survey system.

Referring initially to FIG. 1, illustrated is a plan view of a volumetric or three dimensional (3-D) seismic survey system 100. The seismic survey system 100 includes essentially orthogonal first and second seismic energy sources Sil, Scl located at a source station A and essentially orthogonal first and second seismic energy receivers Ril, Rcl located at a receiver station B. The seismic survey system 100 also includes a recording vehicle 105 employing a computer, which captures and records seismic data received by the first and second seismic energy receivers Ril, Rcl. The computer may also employ algorithms to manipulate the seismic data. As shown in FIG. 1, both source and receiver stations A, B are positioned with respect to essentially orthogonal inline and crossline locations collectively designated INLINE 1–10 and CROSSLINE 1–10. This orientation is commonly called field coordinate space.

In the illustrated embodiment, the source station A is located on a CROSSLINE 2 and positioned midway between an INLINE 4 and an INLINE 5. The receiver station B is located at the intersection of an INLINE 9 and a CROSSLINE 10. These are arbitrary locations and of course, receivers at more than one receiver station may be arrayed about the source station A (typically at inline-crossline intersections) to receive and record additional reflected seismic energy in a volumetric seismic survey. The first seismic energy source Sil is an inline-polarized horizontal source, and the second seismic energy source Scl is a crossline-polarized horizontal source. Similarly, the first seismic energy receiver Ril is an inline horizontal sensor, and the second seismic energy receiver Rcl is a crossline horizontal sensor. Although not specifically detailed in FIG. 1, source station A and receiver station B also include a vertical seismic energy source Sv and a vertical seismic energy receiver Rv, respectively.

In the seismic survey system 100, the seismic energy imparted at the source station A into the subsurface formations of the earth contains seismic energy modes of various orientations. Generally, these oriented seismic energies contain vertical shear waves, horizontal shear waves, and compression waves. In the field coordinate orientation of FIG. 1, the first and second seismic energy receivers Ril, Rcl receive energies from each of these three modes or orientations that are intermingled together in a way that complicates data processing and imaging.

Figure 2A:
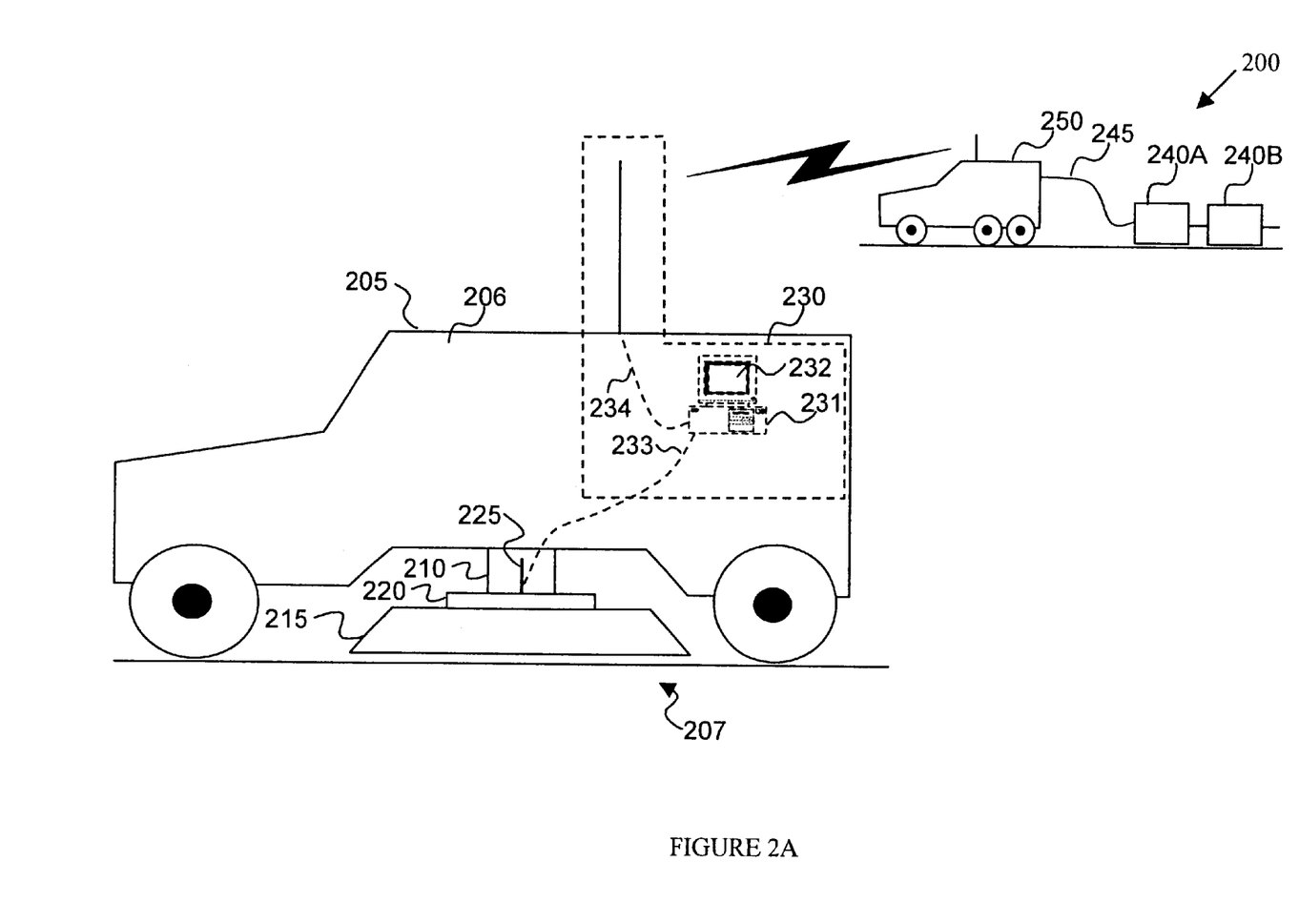
FIG. 2A illustrates a diagram of an embodiment of a seismic exploration system, constructed according to the principles of the present invention.

Turning now to FIG. 2A, illustrated is a diagram of an embodiment of a seismic exploration system 200, constructed according to the principles of the present invention. The seismic exploration system 200 includes a seismic energy source 205, which provides an associated support structure 206 for a directional assembly 207 coupled to it. The seismic exploration system 200 further includes a seismic recorder system 250, which is coupled to a communication network 230 also associated with the seismic energy source 205. The communication network 230 is coupled to the seismic recorder system 250 via a source orientation communication link 234, which is wireless in the illustrated embodiment.

The communication network 230 is also coupled to the directional assembly 207 via a direction indication link 233 and employs a direction orientation system 231 having a direction indicator 232 associated therewith. The seismic exploration system 200 still further includes first and second seismic receivers 240A, 240B that are located on a terrain where they are positioned in a survey grid having inline and crossline orientations. The first and second seismic receivers 240A, 240B are coupled to the seismic recorder system 250 via a seismic data cable 245.

The directional assembly 207 includes a mount 210 that is coupable to the support structure 206 and a rotatable mass assembly 215 that is coupable to the mount 210. The directional assembly 207 further includes a compass rose 220 that is coupled to the rotatable mass assembly 215 and a direction reference 225 that is coupled to the mount 210, in the illustrated embodiment. The compass rose 220 is registered with the direction reference 225 to provide a direction orientation of the rotatable mass assembly 215 with respect to the mount 210.

Figure 2B:
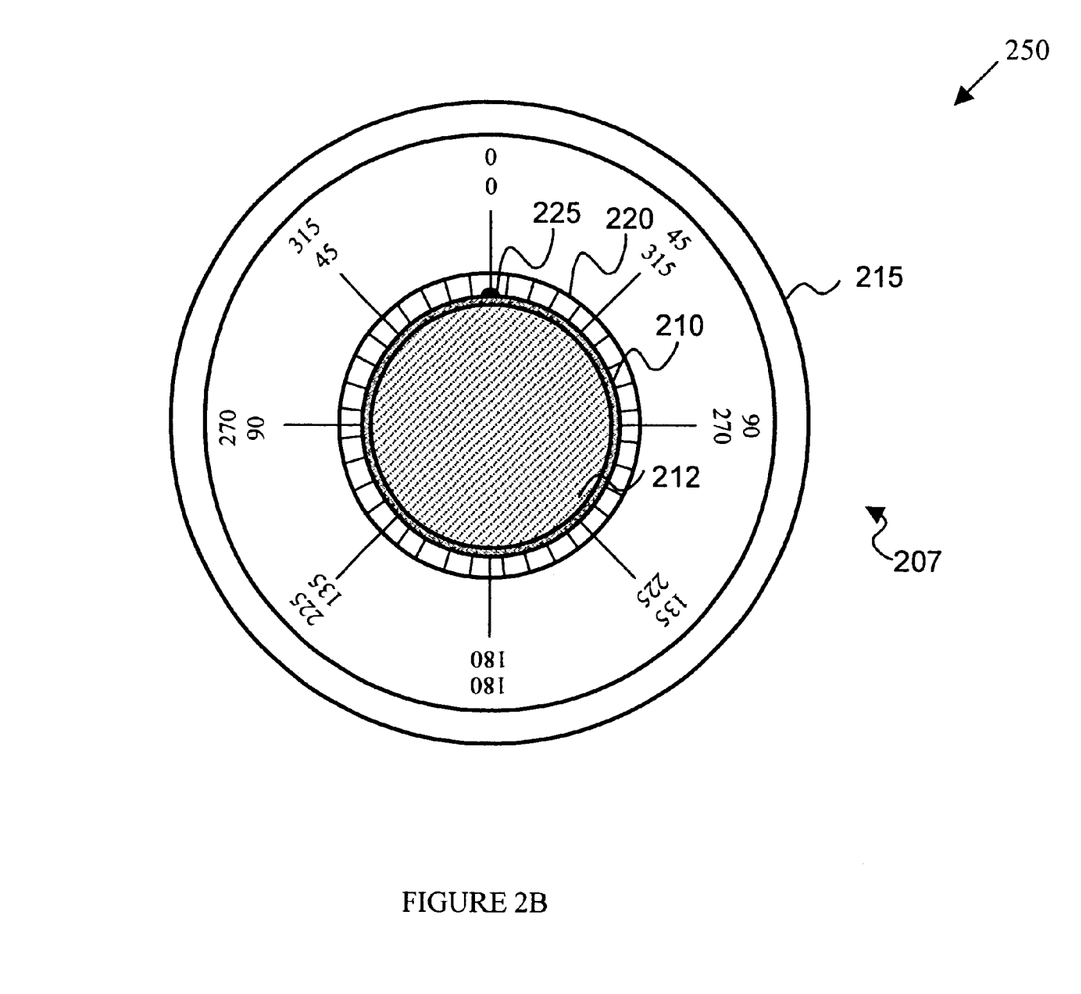
FIG. 2B illustrates a plan view of an embodiment of the directional assembly of FIG. 2A, constructed according to the principles of the present invention.

Turning momentarily to FIG. 2B, illustrated is a plan view 250 of an embodiment of the directional assembly 207 of FIG. 2A, constructed according to the principles of the present invention. The plan view 250 shows the direction reference 225 coupled to the mount 210. The mount 210 is a stationary cylindrical housing that is directly coupled to the support structure 206, which is depicted as a vehicle in FIG. 2A. The compass rose 220 is coupled to the rotatable mass assembly 215 in a fixed arrangement so that rotation of the rotatable mass assembly 215 also rotates the compass rose 220 by a like amount. In the compass rose 220, angular demarcations of 45 degree increments are labeled and smaller demarcations representing 10 degree increments are also shown. A shaft 212, which is concentric with the mount 210, supports the rotatable mass assembly 215 and the compass rose 220. The shaft 212 allows them to rotate in either direction with respect to the support structure 206 and the mount 210.

In the illustrated embodiment, the compass rose 220 includes signal transmitters (not shown) that are located adjacent an inner circumference. The signal transmitters allow a rotation of the compass rose 220 to be discerned within one degree of circumference when employed with a signal receiver (not shown) that is located within the direction reference 225. The illustrated embodiment employs an optical positioning arrangement using 360 light-emitting signal transmitters that communicate with a light-sensitive signal receiver to discern rotational position of the rotatable mass assembly 215. The signal receiver converts an optical signal received into an electrical signal. Of course, other signal transmitting and receiving arrangements such as using wireless electromagnetic or magnetic energy, mechanical contacts or visual alignments of rotation are well within the broad scope of the present invention.

In an alternative embodiment, the compass rose 220 may be coupled to the mount 210 and the direction reference 225 may be coupled to the rotatable mass assembly 215. Additionally, the compass rose 220 may include a collection of signal receivers and the direction reference 225 may include a single signal transmitter. Or, the compass rose 220 may include a single signal receiver and the direction reference 225 may include a collection of signal transmitters. Alternatively, the compass rose 220 may include a single signal transmitter and the direction reference 225 may include a collection of signal receivers. The compass rose 220 may also locate these signal transmitters or receivers adjacent an outer circumference, as well.

Returning to FIG. 2A, the illustrated embodiment employs a computer and computer monitor for the direction orientation system 231 and the direction indicator 232, respectively. The direction indication link 233 is an electrical cable that is coupled between the direction reference 225 and the direction orientation system 231. The direction indication link 231 conveys the converted electrical signal data from the signal receiver associated with the direction reference 225 to the direction orientation system 231 for processing. The indicated rotational orientation of the rotatable mass assembly 215 is then displayed on the direction indicator 232. Additionally, the rotational orientation of the rotatable mass assembly 215 is transmitted to the seismic recorder system 250 via the source orientation communication link 234 for recording and further processing.

The seismic source 205 may traverse the survey grid in a crossline direction and may correspondingly orient the rotatable mass assembly 215 wherein the direction reference 225 corresponds to a crossline direction. Alternatively, the rotatable mass assembly 215 may be oriented wherein the direction reference 225 corresponds to an inline direction or is magnetic north. Of course, the rotatable mass assembly 215 may be generally oriented wherein the direction reference 225 corresponds to a discretionary direction other than crossline, inline or magnetic north. Also, the seismic source 205 may traverse the survey grid in a direction other than crossline and orient the rotatable mass assembly 215 in a discretionary direction, as appropriate.

In the illustrated embodiment, the seismic recorder system 250 may request a particular orientation of the rotatable mass assembly 215 to enhance the response of the first and second seismic receivers 240A, 240B. This request may be conveyed from the seismic recorder system 250 through the communication network 230. It is responded to by an operator of the seismic energy source 205 who then orients the rotatable mass assembly 215 accordingly. In an alternative embodiment, the seismic recorder system 250 may actually control the orientation of the rotatable mass assembly 215 wherein the communication network 230 is empowered to directly control the orientation of the rotatable mass assembly 215.

Figure 3:
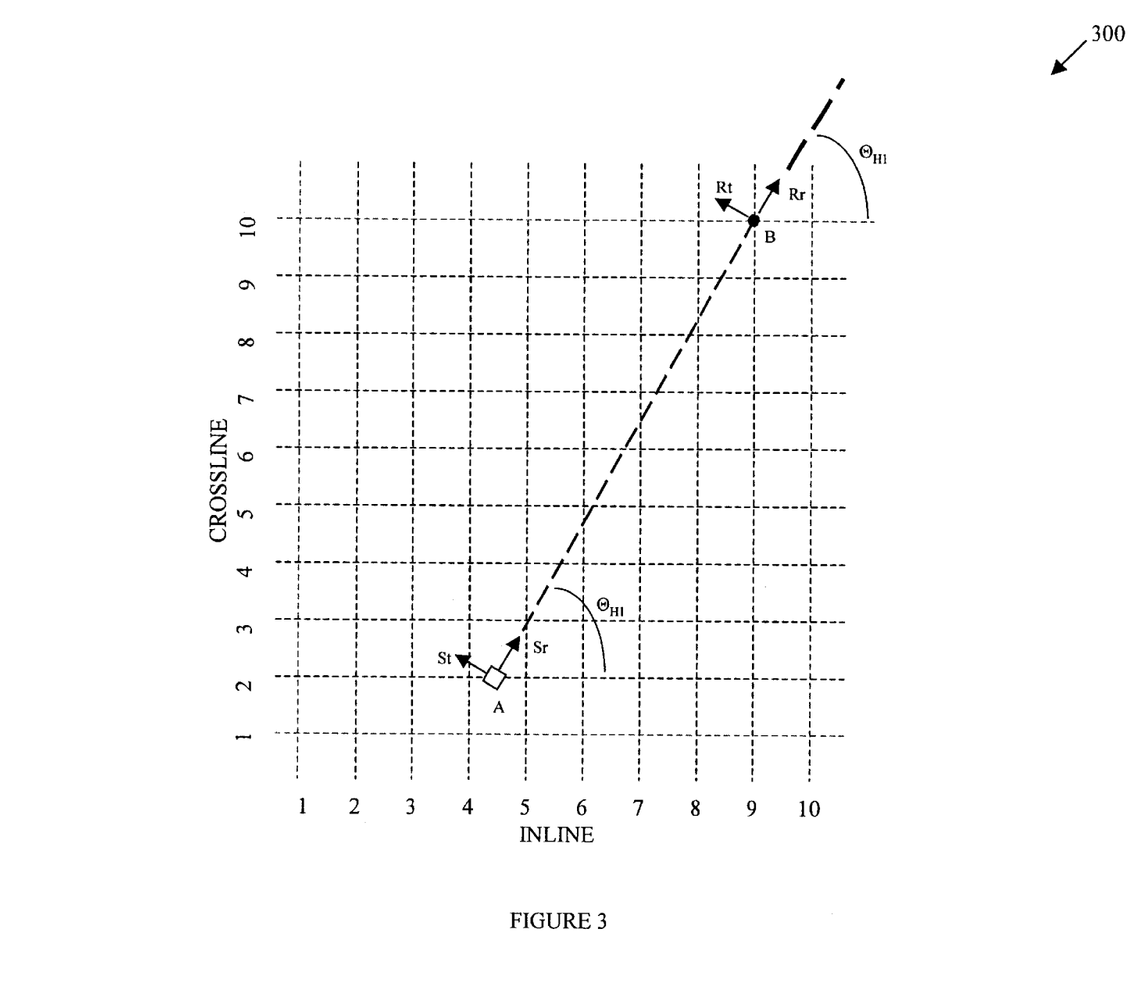
FIG. 3 illustrates a plan view of an embodiment of a seismic survey system showing a transformation in the horizontal plane of the seismic survey system of FIG. 1.

Turning now to FIG. 3, illustrated is a plan view of a seismic survey system 300 showing a transformation in the horizontal plane of the seismic survey system 100 of FIG. 1. The seismic survey system 300 includes essentially orthogonal first and second seismic energy sources Sr, St located at a source station A and essentially orthogonal first and second seismic energy receivers Rr, Rt located at a receiver station B. As shown in FIG. 3, both source and receiver stations A, B are still positioned with respect to essentially orthogonal inline and crossline locations collectively designated INLINE 1–10 and CROSSLINE 1–10, as before. However, the seismic survey system 300 employs a unique coordinate rotation to transform the horizontal sources and receivers from the inline and crossline orientation (field coordinate space) of FIG. 1 to a radial and transverse orientation (radial/transverse coordinate space), as shown in FIG. 3.

This coordinate change employs a trigonometric rotation of both the sources and receivers as defined by an azimuth angle $\Theta_{H1}$. The azimuth angle $\Theta_{H1}$ is defined as the angle between the crossline direction and a straight line formed through the source-receiver station pair A–B, as shown in FIG. 3. This coordinate change is typically accomplished through manipulation and processing of the recorded seismic data, preferably with computers and the appropriate software to accomplish the data manipulation. One who is skilled in the art would understand how to program the computer to make the appropriate data manipulations using the trigonometric function mentioned above. However, this coordinate change may also be accomplished by physically orienting the sources and software orienting the receivers as shown in FIG. 3.

An embodiment of a seismic energy source having a directional assembly, as discussed in FIGS. 2A and 2B, is particularly advantageous for use in the radial and transverse orientation of FIG. 3. The present invention thereby facilitates the directing and focusing of shear wave seismic energy in any direction or azimuth deemed advantageous at the time that the survey is being conducted. This capability allows the seismic energy source to physically provide shear wave energy in the radial or transverse direction that may be maximized for a station or collection of seismic energy receivers while still maintaining an inline and crossline field survey coordinate situation. Then, an appropriate software manipulation or orientation of the receiver data would demonstrate this enhanced shear energy for that receiver station.

Of course, the seismic energy receivers could also be physically oriented, but this is often cumbersome and time consuming in field situations due to the number of receivers and receiver stations. An embodiment of this invention employing a seismic source with an easily-oriented directional assembly allows many data gathering enhancements and test scenarios, especially while in a field environment.

This rotation is, of course, critical for separating wave modes in a 3-D multi-component seismic data acquisition geometry. This coordinate rotation transforms the seismic data to allow the first receiver Rr and the first seismic energy source Sr, which are oriented in the radial direction, to effectively provide a wavefield that is dominated by compression and vertical shear modes. This arrangement minimizes interference from horizontal shear modes. Correspondingly, the rotation also transforms the seismic data to allow the second seismic energy receiver Rt and the second seismic energy source St, which are oriented in the transverse direction, to effectively provide a wavefield that is dominated by horizontal shear reflections having minimal interfering compression and vertical shear modes. This allows further data processing steps to proceed in a more robust manner.

Figure 4:
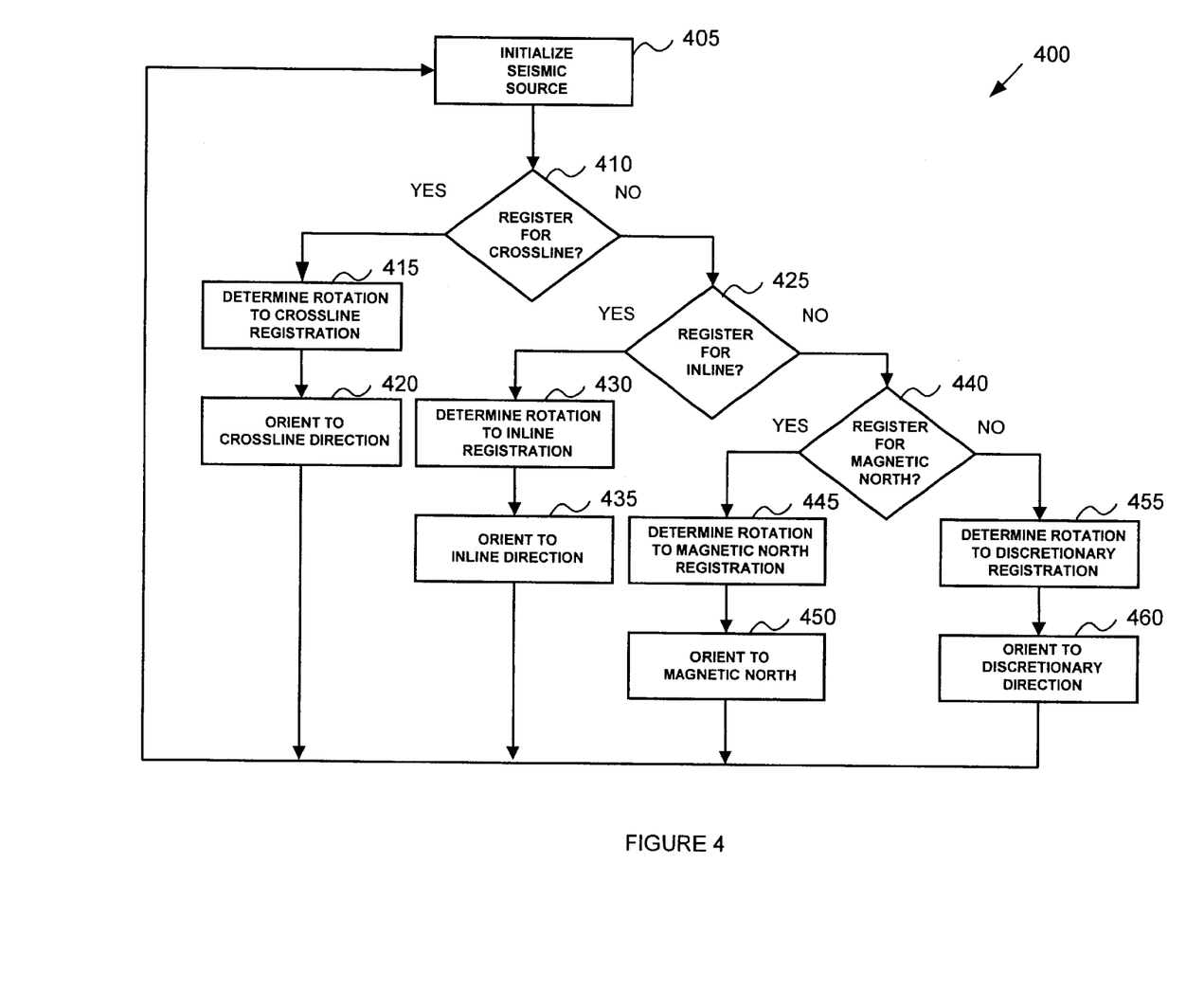
FIG. 4 illustrates a flow diagram of an embodiment of a method of orienting a seismic source constructed according to the principles of the present invention.

Turning now to FIG. 4, illustrated is a flow diagram of an embodiment of a method 400 of orienting a seismic source constructed in accordance with the principles of the present invention. The method 400 includes registering a compass rose with a direction reference to orient a rotatable mass assembly of the seismic source with respect to a mount of the seismic source. Generally, the compass rose may be coupled to either the mount or the rotatable mass assembly wherein the direction reference may then be coupled to either the rotatable mass assembly or the mount, respectively.

In the illustrated embodiment, the compass rose is coupled to the mount and the direction reference is coupled to the rotatable mass assembly. In an alternative embodiment, the compass rose is coupled to the rotatable mass assembly and the direction reference is coupled to the mount. Additionally, the illustrated embodiment includes registering a signal transmitter coupled to the compass rose with a signal receiver coupled to the direction reference. An alternative embodiment includes registering a signal receiver coupled to the compass rose with a signal transmitter coupled to a direction reference.

The method 400 begins in a step 405 wherein determination of an intended direction of travel of the seismic source across the area to be surveyed further allows determination of an orientation of a support structure of the seismic source. Then, in a first decisional step 410, a decision is made as to whether the orientation of the rotatable mass assembly is to be registered in a crossline direction. A decision to register in the crossline direction allows a determination of the angular rotation necessary to register the rotatable mass assembly in the crossline direction to be accomplished in a step 415. Then, in a step 420, the rotatable mass assembly is rotated by the amount determined in the step 415, thereby orienting it to the crossline direction. The method 400 then returns to the step 405.

A decision not to register to the crossline direction in the first decisional step 410 leads to a second decisional step 425 wherein a decision is made as to whether to register the rotatable mass assembly in an inline direction. A decision to register the rotatable mass assembly in the inline direction allows a determination of the angular rotation necessary for accomplishment, in a step 430. The rotatable mass assembly is then appropriately rotated to the inline direction, in a step 435. Then, the method 400 again returns to the step 405.

A decision not to register to the inline direction in the second decisional step 425 leads to a third decisional step 440. A decision is made, in the third decisional step 440, as to whether to register the rotatable mass assembly in the direction of magnetic north. A decision to register in the direction of magnetic north allows a determination of the angular rotation necessary for its accomplishment, in a step 445. Next, the rotatable mass assembly is rotated to the direction of magnetic north in a step 450. The method 400 again returns to the step 405.

A decision not to register to a magnetic north direction in the third decisional step 440 leads to a decision to register the rotatable mass assembly to a discretionary direction that differs from the directions of crossline, inline and magnetic north. For this case, a determination of the angular rotation necessary to accomplish registration to the discretionary direction is accomplished in a step 455, and orientation of the rotatable mass assembly is accomplished in a step 460. The method 400 returns to the step 405.

In summary, a seismic energy source having a directional assembly, as described above, facilitates an initial transformation of seismic data into a radial/transverse coordinate space. This is especially advantageous along a corridor of receiver stations wherein the separation of vertical and horizontal shear mode energies is advantageous. This transformation and separation may also facilitate the identification of subsurface structures of interest such as those that may result from an anisotropy.

Although the present invention has been described in detail, those skilled in the art should understand that they can make various changes, substitutions and alterations herein without departing from the spirit and scope of the invention in its broadest form.

What is claimed is:

1. For use with a seismic energy source, a directional assembly, comprising:
    a mount configured to be coupled to a seismic energy source;
    a rotatable mass assembly coupable to said mount;
    a compass rose coupled to one of said mount or said rotatable mass assembly; and
    a direction reference coupled to another of said one of said mount or said rotatable mass assembly, said compass rose registered with said direction reference to provide a direction orientation of said rotatable mass assembly with respect to said mount.

2. The directional assembly as recited in claim 1 wherein said compass rose is coupled to said mount and said direction reference is coupled to said rotatable mass assembly.

3. The directional assembly as recited in claim 1 wherein said compass rose is coupled to said rotatable mass assembly and said direction reference is coupled to said mount.

4. The directional assembly as recited in claim 1 wherein said direction reference is magnetic north.

5. The directional assembly as recited in claim 1 wherein said direction reference corresponds with a cross line direction.

6. The directional assembly as recited in claim 1 wherein said direction reference corresponds with an inline direction.

7. The directional assembly as recited in claim 1 wherein said compass rose includes a signal transmitter and said direction reference includes a signal receiver.

8. The directional assembly as recited in claim 1 wherein said compass rose includes a signal receiver and said direction reference includes a signal transmitter.

9. A seismic exploration system, comprising:
    a seismic energy source having a support structure associated therewith;
    a directional assembly coupled to said support structure and including:
        a mount coupled to said support structure;
        a rotatable mass assembly coupable to said mount;
        a compass rose coupled to one of said mount or said rotatable mass assembly; and a direction reference coupled to another of said one of said mount or said rotatable mass assembly, said compass rose registered with said direction reference to provide a direction orientation of said rotatable mass assembly with respect to said mount;

receivers located on a terrain; and a seismic recorder system.

10. The system as recited in claim 9 wherein said compass rose is coupled to said mount and said direction reference is coupled to said rotatable mass assembly.

11. The system as recited in claim 10 wherein said compass rose includes a signal transmitter and said direction reference includes signal receivers.

12. The system as recited in claim 11 wherein each of said signal transmitters are located adjacent an outer circumference of said compass rose and each corresponds to a degree of rotation about said circumference.

13. The system as recited in claim 10 wherein said compass rose includes a signal receiver and said direction reference includes signal transmitters.

14. The system as recited in claim 9 wherein said compass rose is coupled to said rotatable mass assembly and said direction reference is coupled to said mount.

15. The system as recited in claim 14 wherein said compass rose includes signal transmitters and said direction reference includes a signal receiver.

16. The system as recited in claim 15 wherein each of said signal transmitters are located adjacent an inner circumference of said compass rose and each corresponds to a degree of rotation about said circumference.

17. The system as recited in claim 9 wherein said compass rose includes signal receivers and said direction reference includes a signal transmitter.

18. The system as recited in claim 9 wherein said direction reference is magnetic north.

19. The system as recited in claim 9 wherein said direction reference corresponds with a cross line direction.

20. The system as recited in claim 9 wherein said direction reference corresponds with an inline direction.

21. The system as recited in claim 9 further including a direction indicator associated with said direction reference configured to provide data regarding said orientation of said rotatable mass assembly.

22. The system as recited in claim 21 further including a communication network coupled to said direction indicator configured to transmit said orientation to said seismic recorder system.

23. The system as recited in claim 9 wherein said receivers are positioned in a crossline and inline grid.

24. A method of orienting a seismic source, comprising:

registering a compass rose with a direction reference to orient a rotatable mass assembly of a seismic source with respect to a mount of said seismic source, said compass rose being coupled to one of said mount or said rotatable mass assembly and said direction reference being coupled to another of said one of said mount or said rotatable mass assembly.

25. The method as recited in claim 24 registering includes registering said compass rose coupled to said mount with said direction reference coupled to said rotatable mass assembly.

26. The method as recited in claim 24 wherein registering includes registering said compass rose coupled to said rotatable mass assembly with said direction reference is coupled to said mount.

27. The method as recited in claim 24 wherein registering includes registering said compass rose with magnetic north.

28. The method as recited in claim 24 wherein registering includes registering said compass rose with a cross line or inline direction.

29. The method as recited in claim 24 wherein registering includes registering a signal transmitter coupled to said compass rose with a signal receiver coupled to said direction reference.

30. The method as recited in claim 24 wherein registering includes registering a signal receiver coupled to said compass rose with a signal transmitter coupled to said direction reference.

\* \* \* \* \*